US011909001B2

United States Patent
Seong et al.

(10) Patent No.: US 11,909,001 B2
(45) Date of Patent: Feb. 20, 2024

(54) APPARATUS FOR MANUFACTURING ALL-SOLID-STATE BATTERY COMPRISING REFERENCE ELECTRODE AND MANUFACTURING METHOD USING SAME

(71) Applicants: HYUNDAI MOTOR COMPANY, Seoul (KR); KIA CORPORATION, Seoul (KR); Institute for Research & Industry Cooperation Pusan National University, Busan (KR)

(72) Inventors: Ju Yeong Seong, Suwon-si (KR); In Woo Song, Gwacheon-si (KR); Hong Seok Min, Yongin-si (KR); Yong Sub Yoon, Seoul (KR); Yun Sung Kim, Seoul (KR); Yong Jun Jang, Seongnam-si (KR); Sung Woo Noh, Seoul (KR); In Chul Kim, Daejeon (KR); A Reum Ha, Ulsan (KR); Heon Cheol Shin, Busan (KR); Yong Guk Gwon, Hwaseong-si (KR); Ji Ung Jeong, Busan (KR); Seong Hyeok Ha, Changwon-si (KR)

(73) Assignees: Hyundai Motor Company, Seoul (KR); Kia Corporation, Seoul (KR); Institute for Research & Industry Cooperation Pusan National University, Busan (KR)

( * ) Notice: Subject to any disclaimer, the term of this patent is extended or adjusted under 35 U.S.C. 154(b) by 205 days.

(21) Appl. No.: 17/398,639

(22) Filed: Aug. 10, 2021

(65) Prior Publication Data

US 2022/0115707 A1 Apr. 14, 2022

(30) Foreign Application Priority Data

Oct. 12, 2020 (KR) .................. 10-2020-0130842

(51) Int. Cl.
*H01M 10/04* (2006.01)
*H01M 10/0585* (2010.01)
(Continued)

(52) U.S. Cl.
CPC ...... *H01M 10/0585* (2013.01); *H01M 4/0433* (2013.01); *H01M 10/0404* (2013.01);
(Continued)

(58) Field of Classification Search
CPC .............. H01M 6/188; H01M 10/0404; H01M 10/058; H01M 4/139; H01M 4/043; H01M 4/0433; B30B 9/28
See application file for complete search history.

(56) References Cited

U.S. PATENT DOCUMENTS 8,652,673 B2 * 2/2014 Tsuchida ............. H01M 10/052
429/231.95
2005/0252603 A1 * 11/2005 Rule ..................... B29C 43/361
425/406
(Continued)

FOREIGN PATENT DOCUMENTS

KR 10-1530812 B1 6/2015

OTHER PUBLICATIONS

Machine translation of Lim et al. (KR101530812) (Year: 2015).*

*Primary Examiner* — Scott W Dodds
(74) *Attorney, Agent, or Firm* — Morgan, Lewis & Bockius LLP (57) ABSTRACT

An apparatus for manufacturing an all-solid-state battery includes: a mold unit which includes a first hole extending vertically so as to have a shape and a width identical with a shape and a width of the all-solid-state battery, and a second hole extending horizontally so as to horizontally communicate with the first hole; a first pressing unit which includes a first protrusion member corresponding to the first hole,
(Continued)

which is coupled with an upper part of the mold unit, and which presses downwards raw materials of the all-solid-state battery filling the first hole, and a second pressing unit which includes a second protrusion member corresponding to the first hole, which is coupled with a lower part of the mold unit, and which presses upwards the raw materials of the all-solid-state battery filling the first hole.

1 Claim, 11 Drawing Sheets

(51) Int. Cl.
      *H01M 10/0525*    (2010.01)
      *H01M 10/0562*    (2010.01)
      *H01M 4/04*    (2006.01)
      *H01M 10/058*    (2010.01)

(52) U.S. Cl.
      CPC ... *H01M 10/0525* (2013.01); *H01M 10/0562* (2013.01); *H01M 10/058* (2013.01); *H01M 2300/0068* (2013.01)

(56) References Cited

U.S. PATENT DOCUMENTS

| | | | |
|---|---|---|---|
| 2019/0006709 A1* | 1/2019 | Komori | H01M 10/0585 |
| 2023/0207866 A1* | 6/2023 | Ha | H01M 10/0562 429/188 |
| 2023/0307727 A1* | 9/2023 | Jung | H01M 50/107 429/90 |

\* cited by examiner

APPARATUS FOR MANUFACTURING ALL-SOLID-STATE BATTERY COMPRISING REFERENCE ELECTRODE AND MANUFACTURING METHOD USING SAME

CROSS REFERENCE TO RELATED APPLICATION

The present application claims the benefit of priority to Korean Patent Application No. 10-2020-0130842, filed on Oct. 12, 2020 in the Korean Intellectual Property Office, the entire content of which is incorporated herein for all purposes by this reference.

TECHNICAL FIELD

The present disclosure relates to an apparatus for manufacturing an all-solid-state battery including a reference electrode, and a manufacturing method using the same.

BACKGROUND

Lithium-ion batteries have presented one of the best performances among existing batteries used as secondary batteries. However, the lithium-ion batteries structurally have an inherent risk of ignition and explosion. For instance, oxygen is contained in a cathode active material, and a liquid electrolyte acts as fuel at high temperatures and thus catches fire.

Specifically, when events such as the generation of lithium dendrite, separation membrane defects, overcharge, and impact on battery cells occur, a large amount of current flows, which leads to dissolution of the separation membrane, exposure of the anode, and a further increase in battery temperatures, resulting in decomposition of a cathode material and release of oxygen. Eventually, oxygen, heat, and fuel meet each other, thus burning the liquid electrolyte.

Accordingly, research is being actively conducted on next-generation batteries having the energy density and stability higher than those of lithium-ion batteries.

The most promising one thereof may be an all-solid-state battery. All-solid-state batteries are batteries in which the electrolyte is solid. Accordingly, all materials become solid materials in the battery.

Since the all-solid-state battery includes a solid electrolyte that does not have the risk of evaporation due to temperature changes or leakage due to external shock, the stability thereof is excellent. Further, volume swelling does not occur, and the battery may normally operate even in extreme external environments with high heat and pressure.

Further, the output thereof may be greatly increased. Unlike lithium-ion batteries that include liquid electrolytes, in the all-solid-state battery, there is no desolvation reaction in which lithium ions are separated from a solvent during charging and discharging. The charging and discharging reaction is directly connected to the diffusion reaction of lithium ions in the solid, so that high output is capable of being realized.

The all-solid-state battery also has the advantage of wide operating temperature. Compared to conventional liquid electrolytes, stable performance may be secured in a wider temperature range. In particular, high ionic conductivity is expected at low temperatures. One of the problems of electric vehicles is that in winter, the battery's performance deteriorates, which reduces the mileage. When the era of all-solid-state batteries comes, the anxiety factors of low-temperature environments will be resolved.

Performance evaluation related to the above advantages of the all-solid-state battery may be made by various items such as charge/discharge capacity, charge/discharge characteristics, high-temperature discharge characteristics, low-temperature discharge characteristics, stability, and lifespan. However, as of yet, there are no regulations for showing standardization of the performance.

Such an all-solid-state battery may turn out to be defective during use or immediately after the manufacture thereof is finished. The occurrence of defects in another battery cannot be suppressed without revealing the cause of the defect.

The method of detecting defective products that is currently available is to sort out a battery that has a reason for failure such as insufficient capacity or a short circuit through photographing using X-rays. To this end, it will be important to more accurately measure and analyze properties such as the capacity of the active material and the electrochemical reaction of electrodes.

The information included in this Background section is only for enhancement of understanding of the general background of the present disclosure and may not be taken as an acknowledgement or any form of suggestion that this information forms the prior art already known to a person skilled in the art.

SUMMARY OF THE DISCLOSURE

An objective of the present disclosure is to provide a method for measuring and analyzing the electrochemical properties of an all-solid-state battery without disassembling the all-solid-state battery.

Another objective of the present disclosure is to provide an all-solid-state battery that stably emits an electrochemical signal.

Another objective of the present disclosure is to provide an all-solid-state battery that emits an electrochemical signal without distortion.

The objectives of the present disclosure are not limited to the foregoing, and other objectives will be able to be clearly understood through the following description and to be realized by the means described in the claims and combinations thereof.

An apparatus for manufacturing an all-solid-state battery according to an aspect of the present disclosure includes: a mold unit which includes a first hole vertically extending so as to have a shape and a width identical with a shape and a width of the all-solid-state battery, and a second hole horizontally extending so as to horizontally communicate with the first hole; a first pressing unit which includes a first protrusion member corresponding to the first hole, which is coupled with an upper part of the mold unit, and which presses downwards raw materials of the all-solid-state battery filling the first hole; and a second pressing unit which includes a second protrusion member corresponding to the first hole, which is coupled with a lower part of the mold unit, and which presses upwards the raw materials of the all-solid-state battery filling the first hole.

The mold unit may further include an insulation member positioned on a surface side of the first hole.

The mold unit may further include an insulation member positioned on a surface side of the second hole.

The first pressing unit and the second pressing unit may include an electroconductive material.

A method of manufacturing an all-solid-state battery according to another aspect of the present disclosure includes: coupling the second pressing unit with the lower part of the mold unit so that the second protrusion member extends through the first hole; adding a first solid electrolyte powder onto the second protrusion member, coupling a first pressing unit with the upper part of the mold unit so that the first protrusion member extending through the first hole, and pressing the first solid electrolyte powder, thereby forming a first solid electrolyte layer, detaching the first pressing unit and inserting a reference electrode through a second hole, and disposing the reference electrode on the first solid electrolyte layer; adding a second solid electrolyte powder onto the reference electrode; coupling the first pressing unit with the upper part of the mold unit so that the first protrusion member is fitted into the first hole, and pressing the second solid electrolyte powder, thereby forming a second solid electrolyte layer, detaching the first pressing unit and seating an anode layer on the second solid electrolyte layer, detaching the second pressing unit and seating a cathode layer on the first solid electrolyte layer, and coupling the mold unit, the first pressing unit, and the second pressing unit, and compressing a coupled structure in the first hole.

The first solid electrolyte powder and the second solid electrolyte powder may include a sulfide-based solid electrolyte.

The reference electrode may include an electric wire which includes at least one selected from the group consisting of tungsten (W), aluminum (Al), nickel (Ni), stainless steel (SUS), and a combination thereof and which is coated with at least one precious metal selected from the group consisting of gold (Au), silver (Ag), platinum (Pt), and a combination thereof.

The manufacturing method may further include inserting a stopping unit into the second hole so that the structure in the first hole is not exposed to the outside through the second hole.

A method of manufacturing an all-solid-state battery according to another aspect of the present disclosure includes: coupling the second pressing unit with the lower part of the mold unit so that the second protrusion member extends through first hole, disposing a cathode layer on the second protrusion member, adding a first solid electrolyte powder onto the cathode layer, coupling the first pressing unit with the upper part of the mold unit so that the first protrusion member of the first pressing unit is fitted into the first hole, thus pressing the first solid electrolyte powder, thereby forming a first solid electrolyte layer; detaching the first pressing unit and inserting a reference electrode through a second hole, and disposing the reference electrode on the first solid electrolyte layer; adding a second solid electrolyte powder onto the reference electrode; coupling the first pressing unit with the upper part of the mold unit so that the first protrusion member extends through the first hole, and pressing the second solid electrolyte powder, thereby forming a second solid electrolyte layer, detaching the first pressing unit and seating an anode layer on the second solid electrolyte layer, and coupling the mold unit, the first pressing unit, and the second pressing unit, and compressing a structure in the first hole.

The first solid electrolyte powder and the second solid electrolyte powder may include a sulfide-based solid electrolyte.

The reference electrode may include an electric wire which includes at least one selected from the group consisting of tungsten (W), aluminum (Al), nickel (Ni), stainless steel (SUS), and a combination thereof and which is coated with at least one precious metal selected from the group consisting of gold (Au), silver (Ag), platinum (Pt), and a combination thereof.

The manufacturing method may further include inserting a stopping unit into the second hole so that the structure in the first hole is not exposed to the outside through the second hole.

According to the present disclosure, since a solid electrolyte in the form of powder and a reference electrode are simultaneously compressed to manufacture a battery, the contact property between the reference electrode and the solid electrolyte is excellent compared to the prior arts. Therefore, it is possible to obtain a stable electrochemical signal using the reference electrode.

Further, according to the present disclosure, since the solid electrolyte is formed very uniformly, it is possible to smoothly operate an all-solid-state battery when analysis is performed using the reference electrode inserted therein.

Further, since other materials such as a conductive paste are not applied between the reference electrode and the solid electrolyte in the present disclosure, the signal of the reference electrode is not distorted by other materials, so the result values are highly reliable.

Further, in the present disclosure, since the inner wall of a mold unit and the vicinity of the reference electrode, which may cause a short circuit, are insulated, the all-solid-state battery may be used without separation from the mold unit after the all-solid-state battery is manufactured. Therefore, there is no hassle of connecting a current collector after the all-solid-state battery is separated from the mold unit, and it is possible to avoid damage to the battery that may occur during the separation process.

The effects of the present disclosure are not limited to the foregoing, and should be understood to include all effects that can be reasonably anticipated from the following description.

DESCRIPTION OF THE EXEMPLARY EMBODIMENTS

The above and other objectives, features and advantages of the present disclosure will be more clearly understood from the following exemplary embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Further, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A reference electrode is defined as an electrode having a stable electrochemical potential that is provided as a reference point for measuring the potentials of one or more electrodes in an electrochemical battery.

Korean Patent No. 10-1530812 (hereinafter, referred to as 'Patent Document 1') relates to a method of manufacturing an all-solid-state battery in which a reference electrode is inserted between solid electrolyte layers. A conductive paste is used to bond the solid electrolyte and the reference electrode.

Specifically, in Patent Document 1, the conductive paste is applied on the solid electrolyte and the reference electrode is pressed on the conductive paste. Accordingly, the interface between the solid electrolyte and the reference electrode is distorted or interfacial contact therebetween is reduced, making it difficult for the reference electrode to detect reliable cathode or anode signals.

Further, according to Patent Document 1, since the conductive paste distorts the solid electrolyte resistance between the reference electrode and the cathode, it is difficult to obtain reliable solid electrolyte resistance.

In the case of Patent Document 1, since a problem occurs in contact between the solid electrolytes positioned on the upper and lower sides of the reference electrode due to the conductive paste, the movement of lithium ions in the solid electrolyte layer is reduced. Eventually, since the signal obtained through the reference electrode is obtained from the all-solid-state battery in an abnormal operating state, it is not possible to accurately determine the state of the battery.

The present disclosure is to overcome the limitations of the prior art as described above, and in the present disclosure, a conductive paste is not used, and the solid electrolyte in a powder state is compressed together with a reference electrode, so that the interface between the both components is evenly formed and lithium ions are smoothly moved within a solid electrolyte layer.

Further, in the manufacturing apparatus according to the present disclosure, since an insulation member is provided in a mold unit, the resultant structure is capable of being used as a battery without separating an all-solid-state battery from the mold unit.

Hereinafter, the present disclosure will be described specifically.

Figure 1:
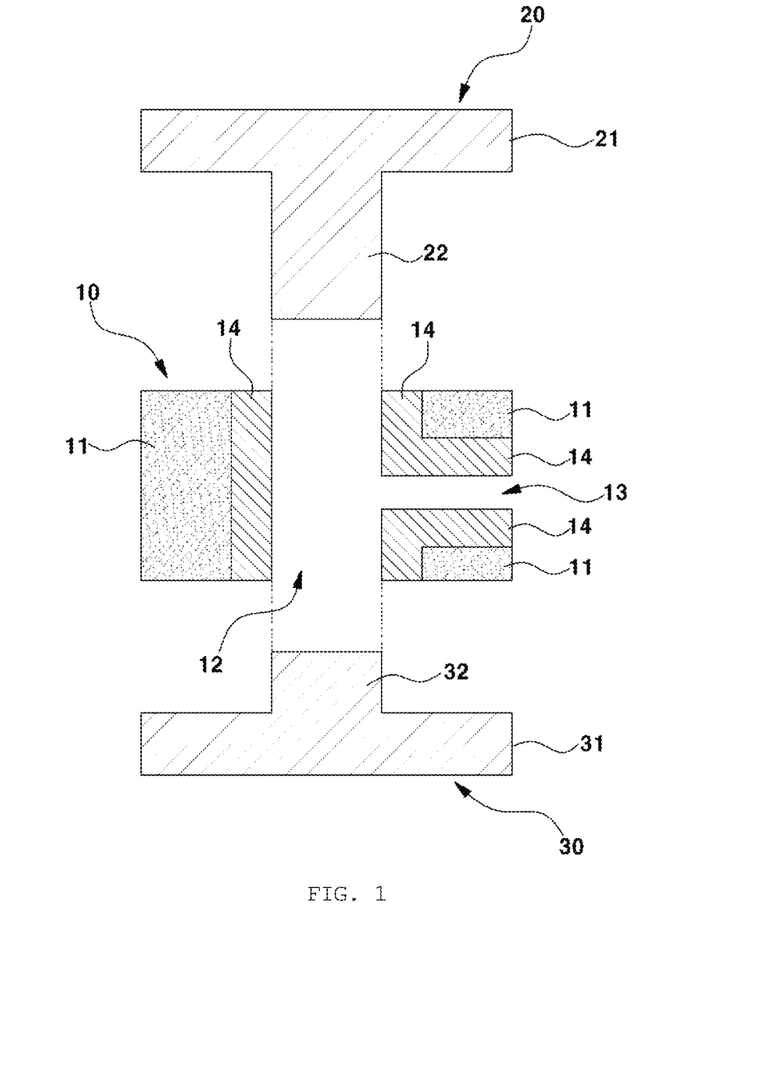
FIG. 1 shows an apparatus for manufacturing an all-solid-state battery according to the present disclosure.
Figure 2:
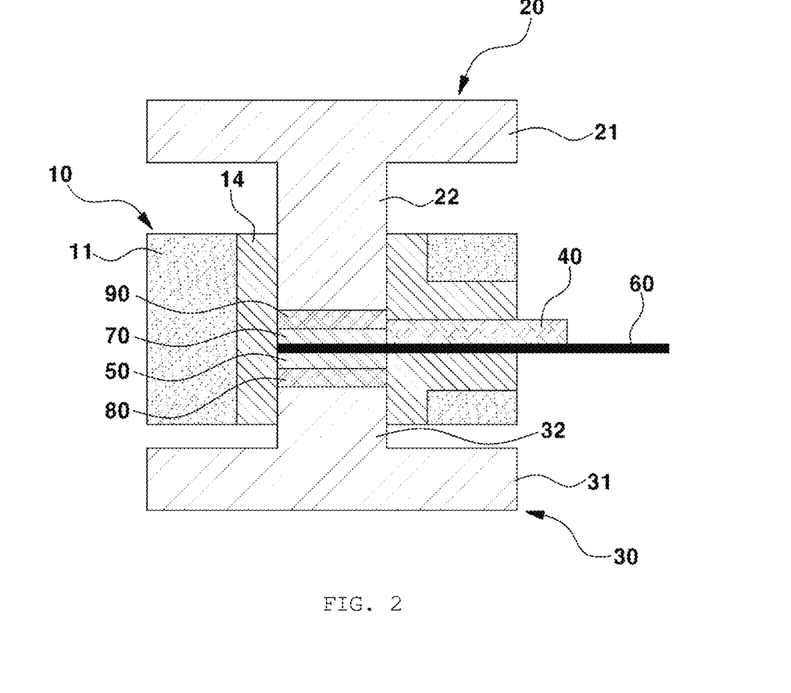
FIG. 2 shows the manufacturing apparatus of FIG. 1 and an all-solid-state battery manufactured using the same.

FIG. 1 shows an apparatus for manufacturing an all-solid-state battery according to the present disclosure. FIG. 2 shows the manufacturing apparatus of FIG. 1 and an all-solid-state battery manufactured using the same. According to the present disclosure, the all-solid-state battery may be driven in the state shown in FIG. 2, and the performance of the all-solid-state battery may be evaluated by collecting electrochemical signals therefrom.

Referring to FIGS. 1 and 2, the manufacturing apparatus includes a mold unit 10 providing a molding space for the all-solid-state battery, a first pressing unit 20 coupled with the upper part of the mold unit 10, and a second pressing unit 30 coupled with the lower part of the mold unit 10. For reference, in the present specification, "upper part" and "lower part" are based on the illustrated state, and the present disclosure is not limited thereto. Specifically, in any embodiment, if the first pressing unit 20 and the second pressing unit 30 are coupled with the mold unit 10 in opposite directions based on the mold unit 10, this constitution should be regarded as belonging to the scope of the present disclosure, without being limited to the terms "upper part" and "lower part".

The mold unit 10 may include a body member 11, a first hole 12, which is vertically formed through the body member 11 so as to have a shape and a width identical with the shape and the width of the all-solid-state battery, and a second hole 13 which is formed therethrough so as to horizontally communicate with the first hole 12.

The mold unit 10 may further include an insulation member 14 positioned on the surface side of the first hole 12 and/or the surface side of the second hole 13.

The first pressing unit 20 includes a first substrate 21, and a first protrusion member 22 which is formed so as to protrude from the first substrate 21 and which has a shape corresponding to that of the first hole 12.

When the first pressing unit 20 is coupled with the mold unit 10, the first substrate 21 is constituted so as to function as a stopper. The first substrate 21 may have a plate-shaped structure formed so as to have an area larger than that of the first hole 12.

The first protrusion member 22 is constituted so as to be fitted into the first hole 12, thus pressing the raw materials in the mold unit 10.

As shown in FIG. 2, finally, the first pressing unit 20 comes into contact with an anode layer 90 through the first protrusion member 22. In the present disclosure, the first substrate 21 and the first protrusion member 22 are constituted so as to include an electroconductive material, whereby the first pressing unit 20 serves as a current collector with respect to the anode layer 90.

The second pressing unit 30 includes a second substrate 31, and a second protrusion member 32 which is formed so as to protrude from the second substrate 31 and which has a shape corresponding to that of the first hole 12.

When the second pressing unit 30 is coupled with the mold unit 10, the second substrate 31 is constituted so as to function as a stopper. The second substrate 31 may have a plate-shaped structure formed so as to have an area larger than the area of the first hole 12.

The second protrusion member 32 is constituted so as to be fitted into the first hole 12, thus pressing the raw materials in the mold unit 10.

As shown in FIG. 2, finally, the second pressing unit 30 comes into contact with a cathode layer 80 through the second protrusion member 32. In the present disclosure, the second substrate 31 and the second protrusion member 32 are constituted so as to include an electroconductive material, whereby the second pressing unit 30 serves as a current collector with respect to the cathode layer 80.

Figure 3:
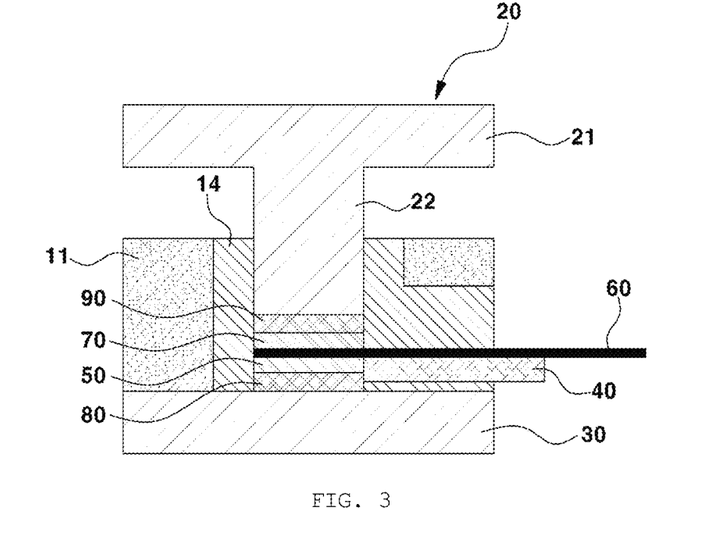
FIG. 3 shows another embodiment of the manufacturing apparatus according to the present disclosure.

FIG. 3 shows another embodiment of the manufacturing apparatus according to the present disclosure. In this embodiment, pressing is not performed in a vertical direction as in the above-described embodiment, but pressing is performed only in any one direction and preferably pressing is performed only by the first pressing unit 20, and the second pressing unit 30 is implemented by a plate-shaped base substrate. However, the present disclosure is not limited thereto, but the first pressing unit 20 may have a plate shape and pressing may be performed by the second pressing unit 30.

FIGS. 4A, 4B, 4C, 4D, 4E, 4F, 5, 6A and 6B are reference views illustrating a method of manufacturing an all-solid-state battery according to the present disclosure.

Hereinafter, the manufacturing method will be specifically described with reference to FIGS. 4A, 4B, 4C, 4D, 4E, 4F, 5, 6A and 6B in chronological order.

Figure 4A:
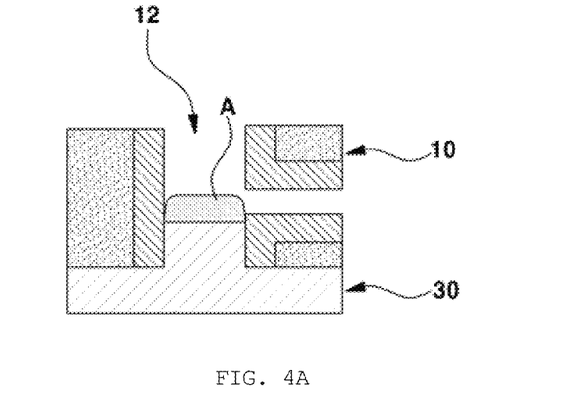
FIGS. 4A, 4B, 4C, 4D, 4E and 4F are reference views illustrating a part of a method of manufacturing an all-solid-state battery according to the present disclosure.

Referring to FIG. 4A, in the manufacturing method, first, a second pressing unit 30 is coupled with a lower part of a mold unit 10 so that a protrusion member 32 of the second pressing unit 30 is fitted into a first hole 12. Thereafter, a first solid electrolyte powder A is added onto the protrusion member 32 of the second pressing unit 30.

In the present disclosure, the solid electrolyte layer that is formed in advance is not inserted into the mold unit 10, but the solid electrolyte powder is added and then pressed together with a reference electrode 60 as will be described later, thus forming solid electrolyte layers 50 and 70. Accordingly, the interface between the solid electrolyte layers 50 and 70 and the reference electrode 60 is evenly formed.

The first solid electrolyte powder A may include a sulfide-based solid electrolyte. Examples of the sulfide-based solid electrolyte may include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_x$ (m and n are a positive number, and Z is any one of Ge, Zn, and Ga), $Li_2S$—$GeS_2$, $Li_2S$—$SiS_2$—$Li_3PO_4$, $Li_2S$—$SiS_2$—$Li_xMO_y$ (x and y are a positive number, and M is any one of P, Si, Ge, B, Al, Ga, and In), and $Li_{10}GeP_2S_{12}$.

Figure 4B:
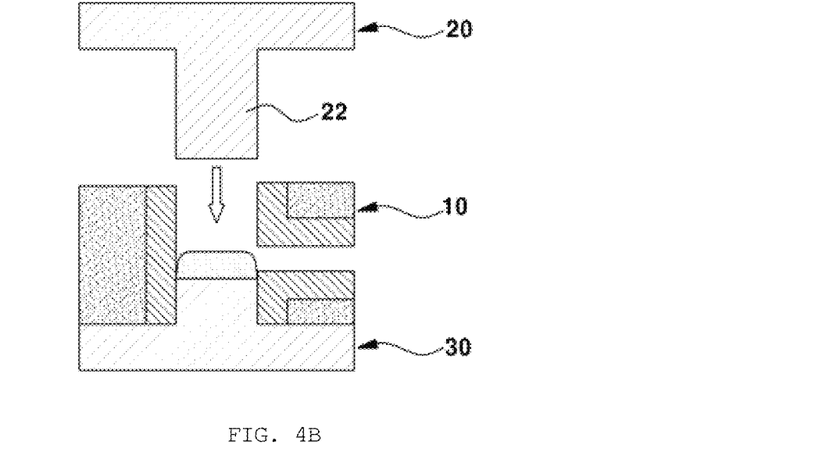
Figure 4C:
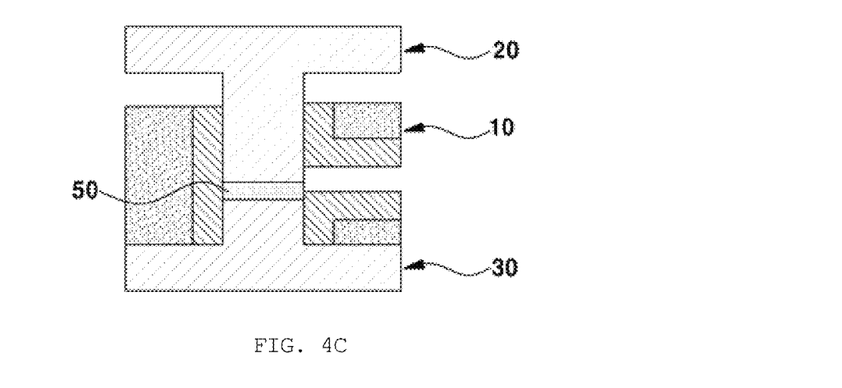

Referring to FIG. 4B, a first pressing unit 20 is coupled with an upper part of the mold unit 10 so that a protrusion member 22 of the first pressing unit 20 is fitted into the first hole 12, thus pressing the first solid electrolyte powder A. As a result, a first solid electrolyte layer 50 may be obtained as shown in FIG. 4C.

Figure 4D:
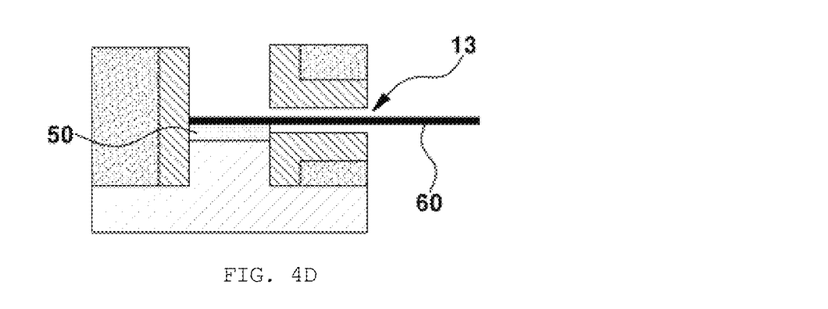

Thereafter, as shown in FIG. 4D, the first pressing unit 20 is detached, and a reference electrode 60 is inserted through a second hole 13, thus seating the reference electrode 60 on the first solid electrolyte layer 50.

Figure 5:
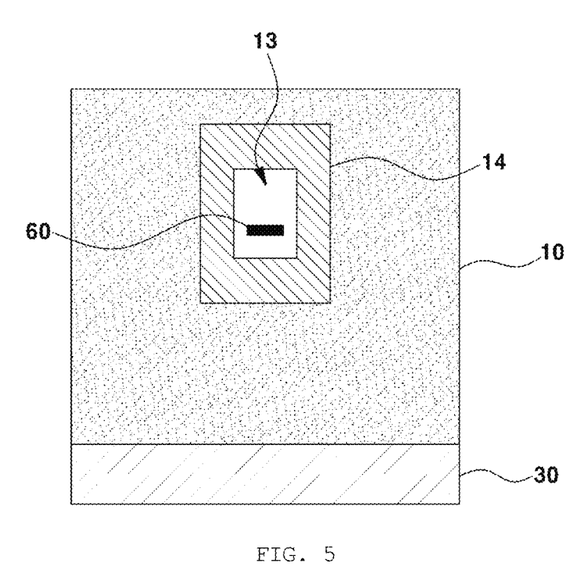
FIG. 5 is a reference view illustrating a form in which a reference electrode is inserted in the present disclosure.

As shown in FIG. 5, the reference electrode 60 is seated with a space so as to prevent contact with the insulation member 14 provided on the surface side of the second hole 13. This is to prevent the reference electrode 60 from being damaged by the insulation member 14 when the volumes of the solid electrolyte layers 50 and 70 are reduced due to the subsequent compression of the all-solid-state battery.

The reference electrode 60 may include an electric wire which includes at least one selected from the group consisting of tungsten (W), aluminum (Al), nickel (Ni), stainless steel (SUS), and a combination thereof and which is coated with at least one precious metal selected from the group consisting of gold (Au), silver (Ag), platinum (Pt), and a combination thereof.

The material of the electric wire is not particularly limited, and any material may be used as long as the material has low reactivity with respect to the solid electrolyte such as tungsten (W) and aluminum (Al), nickel (Ni), and stainless steel (SUS) having the strength comparable to that of tungsten.

Since the reference electrode 60 is a kind of electric wire, the reference electrode does not serve to physically separate the first solid electrolyte layer 50 from the second solid electrolyte layer 70 unlike a separation membrane.

Figure 4E:
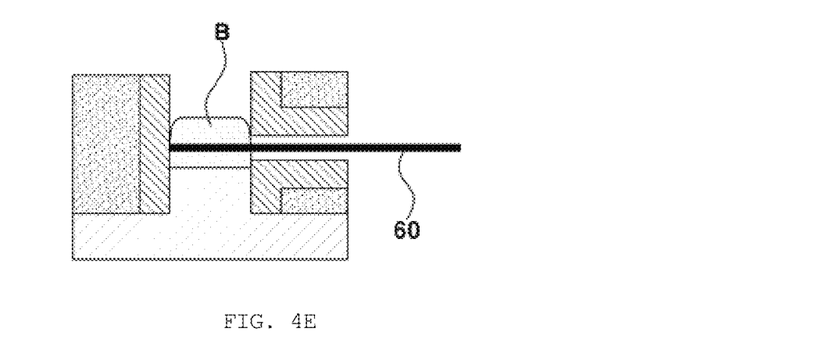

After the reference electrode 60 is seated, as shown in FIG. 4E, a second solid electrolyte powder B is added onto the reference electrode 60.

The second solid electrolyte powder B may include a sulfide-based solid electrolyte. Examples of the sulfide-based solid electrolyte may include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_x$ (m and n are a positive number, and Z is any one of Ge, Zn, and Ga), $Li_2S$—$GeS_2$, $Li_2S$—$SiS_2$—$Li_3PO_4$, $Li_2S$—$SiS_2$—$Li_xMO_y$ (x and y are a positive number, and M is any one of P, Si, Ge, B, Al, Ga, and In), and $Li_{10}GeP_2S_{12}$. The second solid electrolyte powder B may be the same as or different from the first solid electrolyte powder A.

Figure 4F:
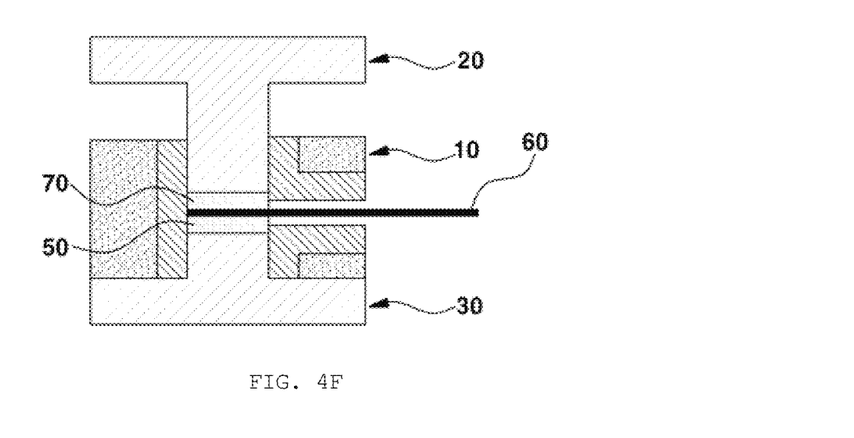

Thereafter, as shown in FIG. 4F, the first pressing unit 20 may be coupled with the upper part of the mold unit 10 so that the protrusion member 22 of the first pressing unit 20 is fitted into the first hole 12, thus pressing the second solid electrolyte powder B, thereby forming a second solid electrolyte layer 70.

Through the above process, the structure in which the reference electrode 60 is inserted between the first solid electrolyte layer 50 and the second solid electrolyte layer 70 may be obtained. In the process of obtaining the above-described structure, the first pressing unit 20 and the second pressing unit 30 may apply a pressure only enough to maintain the shape of a series of layers of the first solid electrolyte powder A and the second solid electrolyte powder B. That is, a low pressure is applied for the purpose of flattening instead of applying a high pressure as in the manufacture of the all-solid-state battery using a dry process.

Thereafter, the first pressing unit 20 is detached, and an anode layer 90 is seated on the second solid electrolyte layer 70. Further, the second pressing unit 30 is detached, and a cathode layer 80 is seated on the first solid electrolyte layer 50.

Figure 6A:
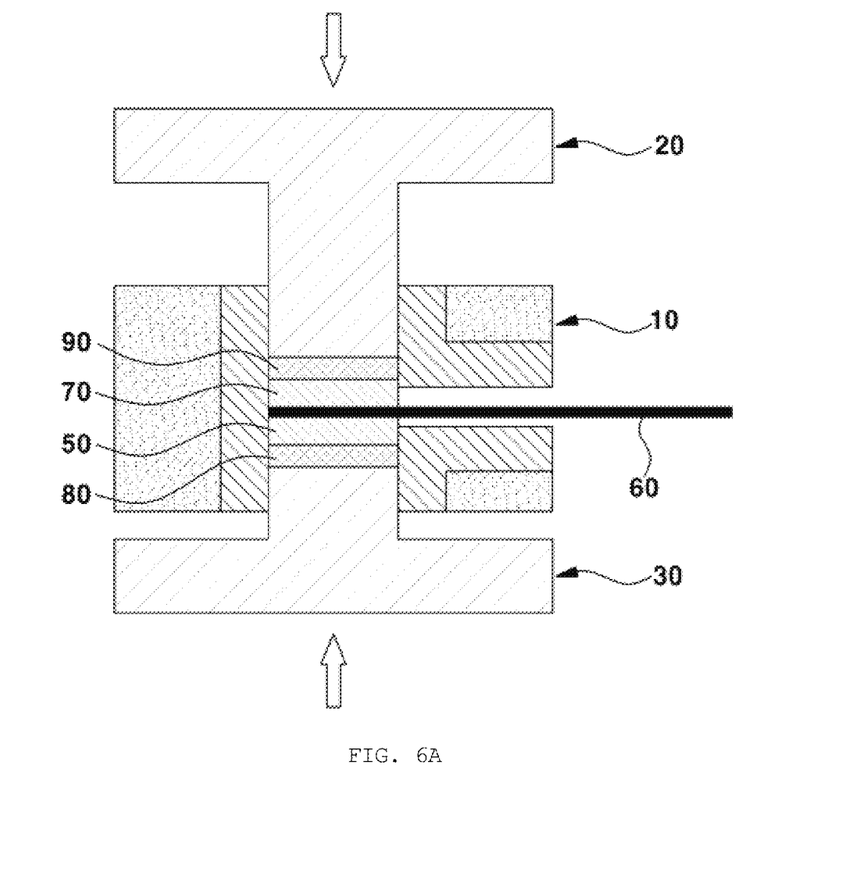
FIGS. 6A and 6B are reference views illustrating a part of a method of manufacturing an all-solid-state battery according to the present disclosure.

When the structure including the cathode layer 80, the first solid electrolyte layer 50, the reference electrode 60, the second solid electrolyte layer 70, and the anode layer 90 in consecutive order from the bottom in the first hole 12 of the mold unit 10 is completed as shown in FIG. 6A, the first pressing unit 20 and the second pressing unit 30 are simultaneously driven to press the structure under high pressure. As a result, an all-solid-state battery including the reference electrode 60 shown in FIG. 6B may be obtained.

Figure 6B:
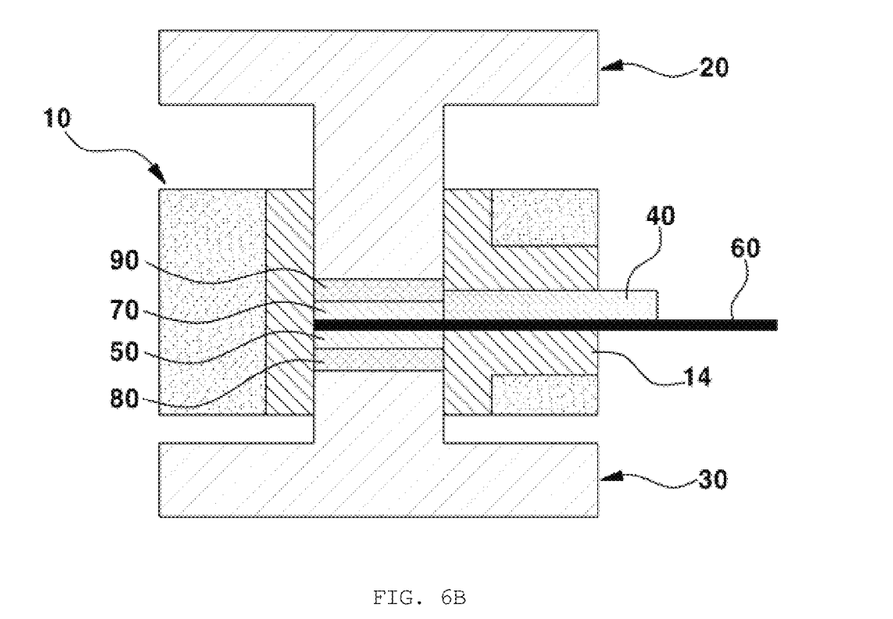

The reference electrode 60 must not be lowered further than the insulation member 14 provided on the surface side of the second hole 13, but must be in a position so as to at least be in contact with the insulation member 14.

Further, a stopping unit 40 is inserted into the second hole 13 of the mold unit 10 so that the structure is not exposed to the outside. It may be preferable to use the stopping unit 40 including an elastic insulating material.

In the above, the manufacturing method is described, in which the first solid electrolyte layer 50, the reference electrode 60, and the second solid electrolyte layer 70 are formed and then the cathode layer 80 and the anode layer 90 are added. However, the manufacturing method of the present disclosure is not limited thereto, and as will be described later, a method that includes first adding the cathode layer 80, forming the first solid electrolyte layer 50, the reference electrode 60, and the second solid electrolyte layer 70 on the cathode layer 80, and adding the anode layer 90 may be used to obtain the same all-solid-state battery.

Specifically, another embodiment of the manufacturing method according to the present disclosure may include coupling the second pressing unit 30 with the lower part of the mold unit 10 so that the protrusion member 32 of the second pressing unit 31 is fitted into the first hole 12, seating the cathode layer 80 on the protrusion member 32 of the second pressing unit 30, adding the first solid electrolyte powder A onto the cathode layer 80, coupling the first pressing unit 20 with the upper part of the mold unit 10 so that the protrusion member 22 of the first pressing unit 20 is fitted into the first hole 12, thus pressing the first solid electrolyte powder A, thereby forming the first solid electrolyte layer 50, detaching the first pressing unit 20 and inserting the reference electrode 60 through the second hole 13, thus seating the reference electrode on the first solid electrolyte layer 50, adding the second solid electrolyte powder B onto the reference electrode 60, coupling the first pressing unit 20 with the upper part of the mold unit 10 so that the protrusion member 22 of the first pressing unit 20 is fitted into the first hole 12, thus pressing the second solid electrolyte powder B, thereby forming the second solid electrolyte layer 70, detaching the first pressing unit 20 and seating the anode layer 90 on the second solid electrolyte layer 70, and coupling the mold unit 10, the first pressing unit 20, and the second pressing unit 30, thus compressing a structure in the first hole 12.

Hereinafter, the present disclosure will be described in more detail through a specific Example. The following Example is only an example to aid understanding of the present disclosure, and the scope of the present disclosure is not limited thereto.

Example

An all-solid-state battery including a reference electrode was manufactured using the method shown in FIGS. 4A, 4B, 4C, 4D, 4E, 4F, 5, 6A and 6B. As the reference electrode, an electric wire was used, which had a diameter of 50 μm, included tungsten (W), and was coated with gold (Au) to a thickness of 0.5 μm. A sulfide-based solid electrolyte powder was used therein.

Comparative Example

The same material as in the Example was used, and the same method as in Patent Document 1 was used, in which a reference electrode was bonded using a conductive paste and then inserted between the two completed solid electrolyte layers, thereby manufacturing an all-solid-state battery.

Experimental Example 1—Analysis of Cross-Section

The interface between the reference electrode and the solid electrolyte of the all-solid-state battery according to the Example and the Comparative Example was observed. The side surfaces of each all-solid-state battery were cut using an ionic beam cross section polisher, and the interface thereof was observed through an electron scanning microscope.

Figure 7A:
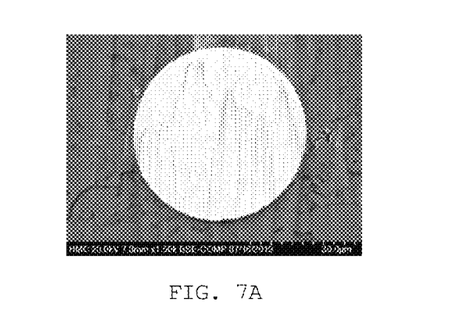
FIGS. 7A and 7B show the results obtained by analyzing the cross-section of the periphery of the reference electrode of an all-solid-state battery according to an Example with different scales using an electron scanning microscope.
Figure 7B:
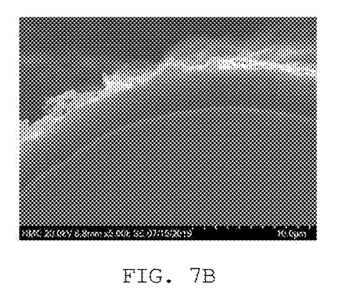
Figure 8A:
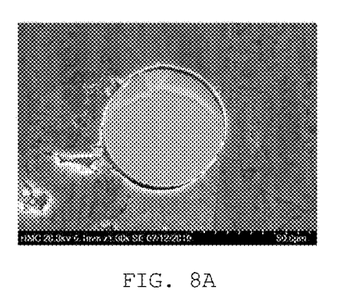
FIGS. 8A and 8B show the results obtained by analyzing the cross-section of the periphery of the reference electrode of an all-solid-state battery according to a Comparative Example using an electron scanning microscope.
Figure 8B:
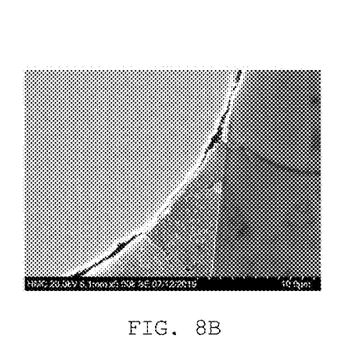

FIGS. 7A and 7B show the results for the cross-section of the periphery of the reference electrode of the all-solid-state battery according to the Example. FIGS. 8A and 8B show the results for the cross-section of the periphery of the reference electrode of the all-solid-state battery according to the Comparative Example.

Referring to FIGS. FIGS. 7A and 7B, it can be seen that the reference electrode and the solid electrolyte are in good contact with each other without any detachment in the present disclosure. In contrast, referring to FIGS. FIGS. 8A and 8B, it can be seen that in the case of the all-solid-state battery manufactured using the method of Patent Document 1, the reference electrode and the solid electrolyte are separated from each other in most areas thereof and the contact property thereof is very poor.

Experimental Example 2—Measurement of Potential Signal

The potential signals of the cathode and anode were measured using the reference electrode of the all-solid-state battery according to the Example and the Comparative Example.

In the case of the Comparative Example, the all-solid-state battery had to be separated from the mold in order to measure the potential signal, but a large external force was applied due to the difficulty in separation, causing damage to the battery. Accordingly, in the Comparative Example of the present Experimental Example 2, the reference electrode was bonded using a conductive paste and inserted between the two completed solid electrolyte layers as in Patent Document 1, and the manufacturing apparatus according to the present disclosure was used to manufacture the all-solid-state battery.

Figure 9A:
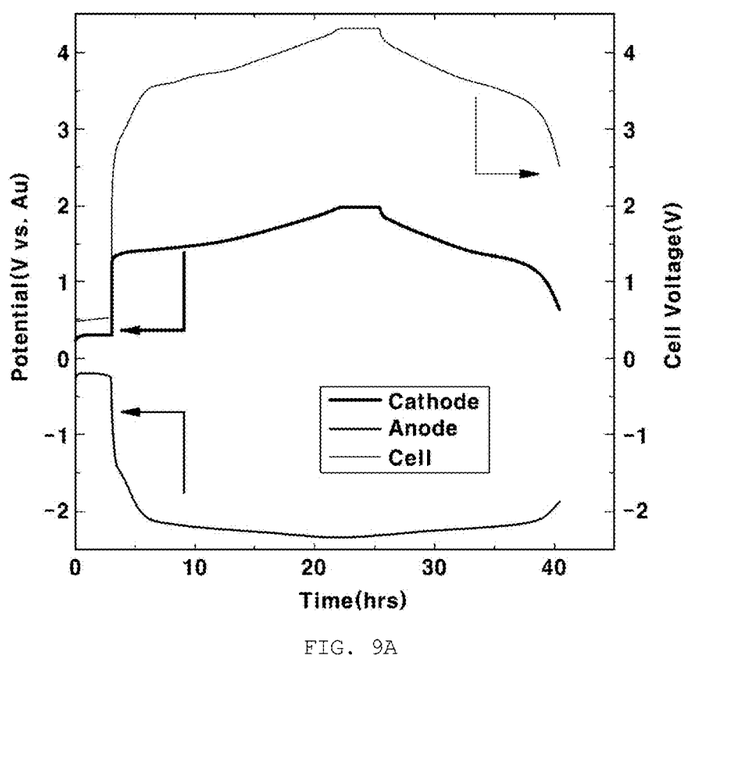
FIG. 9A shows the result obtained by measuring potential signals of the cathode and anode of an all-solid-state battery according to an Example.
Figure 9B:
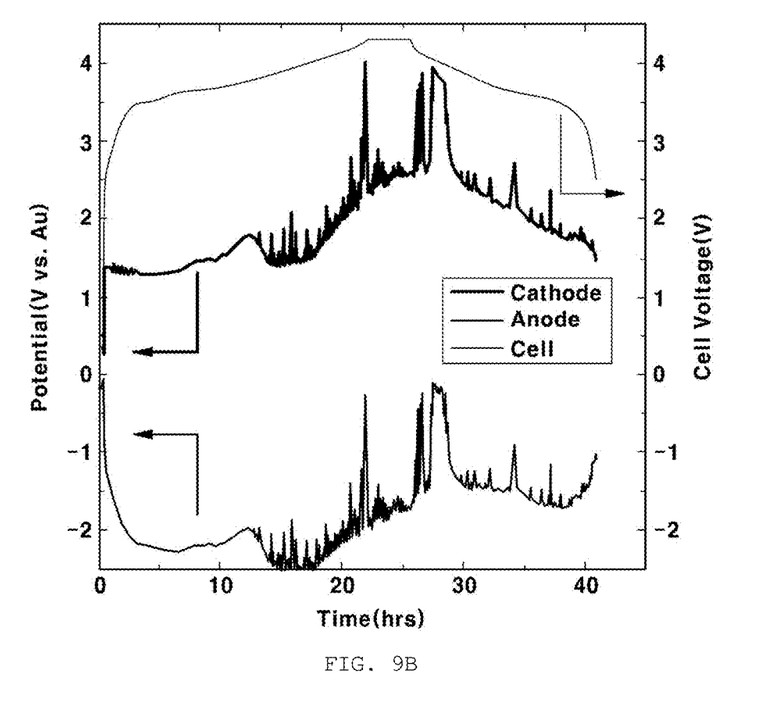
FIG. 9B shows the result obtained by measuring potential signals of the cathode and anode of an all-solid-state battery according to a Comparative Example.

FIG. 9A shows the result for the all-solid-state battery according to the Example. FIG. 9B shows the result for the all-solid-state battery according to the Comparative Example.

Referring to FIG. 9A, it can be seen that the potential signals of the cathode and the anode are measured very stably in the case of the all-solid-state battery according to the Example. In contrast, referring to FIG. 9B, it can be seen that the potential signals of the cathode and the anode are very unstable in the case of the Comparative Example.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. An apparatus for manufacturing an all-solid-state battery, comprising:
   a mold unit which includes:
      a first hole extending vertically so as to have a shape and a width identical with those of the all-solid-state battery; and
      a second hole extending horizontally so as to horizontally communicate with the first hole;
   a first pressing unit which includes a first protrusion member corresponding to the first hole, the first protrusion member coupled with an upper part of the mold unit and configured to press downwards raw materials of the all-solid-state battery filling the first hole; and
   a second pressing unit which includes a second protrusion member corresponding to the first hole, the second protrusion coupled with a lower part of the mold unit and configured to press upwards the raw materials of the all-solid-state battery filling the first hole,
   wherein the first pressing unit and the second pressing unit include an electroconductive material,
   wherein the mold unit further includes an electric insulation member, positioned to surround a side of the first hole parallel to a direction in which the first hole extends, excluded from a portion comprising the second hole,
   wherein the mold unit further includes an electric insulation member positioned to surround a side of the second hole parallel to a direction in which the second hole extends.

* * * * *